United States Patent [19]

DeFrees, deceased

[11] Patent Number: 4,457,486

[45] Date of Patent: Jul. 3, 1984

[54] DISCHARGE CONTROL MEANS FOR A STORAGE TANK FOR LIQUID

[75] Inventor: Joseph H. DeFrees, deceased, late of Warren, Pa.

[73] Assignee: Allegheny Valve Company, Warren, Pa.

[21] Appl. No.: 373,099

[22] Filed: Apr. 29, 1982

[51] Int. Cl.³ .............................................. F16K 31/16
[52] U.S. Cl. ...................................... 251/58; 251/144; 74/110
[58] Field of Search ...................... 251/58, 144; 74/110

[56] References Cited

U.S. PATENT DOCUMENTS

| 2,159,979 | 5/1939 | Parsons | 251/58 X |
| 2,600,977 | 6/1952 | DeFrees | |
| 2,953,345 | 9/1960 | Slemmons et al. | 251/144 |
| 3,770,011 | 11/1973 | Muehl | 251/144 X |
| 3,910,551 | 10/1975 | DeFrees | |

FOREIGN PATENT DOCUMENTS

| 684134 | 4/1964 | Canada | |
| 1202660 | 7/1959 | France | 251/58 |
| 1404049 | 8/1975 | United Kingdom | 251/58 |

Primary Examiner—Arnold Rosenthal
Attorney, Agent, or Firm—Baldwin, Egan, Walling & Fetzer

[57] ABSTRACT

A discharge control for a storage tank for liquid, such as a gasoline transport tank, with the tank having an outlet port with the control comprising an emergency valve associated with the port, with such emergency valve normally being biased to a closed position, whereby discharge from the tank is prevented. Enclosed or protected valve operating means coacts with the emergency valve and is responsive to air pressure, for overcoming the normal valve closing bias of the emergency valve, wth the valve operating means including a crank comprising an operating lever with a crank case in which the lever is disposed, and with an air operated reciprocal motor unit secured to the crank case for coaction with the lever of the crank upon application of pressurized air to the motor unit, to cause the crank to move the emergency valve to open position. The valve operating means is able to be operated manually in the event of failure of the pressurized air supply.

14 Claims, 10 Drawing Figures 4,457,486

DISCHARGE CONTROL MEANS FOR A STORAGE TANK FOR LIQUID

This invention relates in general to control means for controlling fluid flow from an enclosure or tank, such as for instance a tank truck or trailer used for transportation of various types of liquids, as for example, gasoline, chemicals, oils or the like. More particularly, this invention relates to a remote control for an emergency valve associated with an outlet port of a storage tank, and especially relates to the valve operating means coacting with the emergency valve, with such valve operating means being enclosed to restrict corrosion, dirt and the like, and being responsive to air pressure for overcoming the normal emergency valve closing bias. The valve operating means includes a reciprocal air motor unit secured to a crank case, in which a crank lever of the valve operating means is disposed for operating the emergency valve. The air motor unit includes a piston adapted for actuating coaction with the lever of the crank in the crank case, upon application of pressurized air to the motor unit, to cause the operating head of the crank to move the emergency valve to open position. Means is provided for permitting manual operation of the valve operating means in the event of failure of the source of pressurized air.

BACKGROUND OF THE INVENTION

Many types of control means for controlling the operation of emergency valves in a liquid storage tank of a transport vehicle, including remote control of the emergency valve, are known in the art. Canadian Pat. No. 684,134 issued Apr. 14, 1964 to Applicant and entitled "Cascade Emergency Valve" discloses an emergency valve which is operated from a remote location by means of a cable or cord. U.S. Pat. No. 2,600,977 issued June 17, 1952 to Applicant discloses an emergency valve system for a gasoline transport truck, which is remotely controlled, utilizing compressed air tapped from a manually operated pump disposed in a cabinet on the vehicle. U.S. Pat. No. 3,190,551 issued Oct. 7, 1975 to Applicant discloses a remote control, internal emergency valve for the outlet of a transportation storage tank, operable by compressed air.

SUMMARY OF THE INVENTION

The present invention provides an air driven operating means for an emergency valve of a storage tank, with the crank mechanism for operating the emergency valve being enclosed in part within a crank case, with a reciprocal air motor unit mounted on the crank case and operable to cause actuation of the crank for opening the emergency valve from a remote location; and wherein in the event of a failure of the source of pressurized air, the control can be operated manually. By having the valve operating means enclosed or disposed in a sealed housing arrangement, exposure of the working parts of the mechanism to the outside environment and subsequent damage or malfunction due to freezing, or road salt, dirt, corrosion etc. are prevented.

Accordingly, an object of the invention is to provide a novel arrangement of sealed or enclosed emergency valve operating means.

Another object of the invention is to provide a valve operating means of the above type which includes an air operated reciprocal motor unit secured to a crank case in which is disposed a crank of the valve operating means, thereby protecting the parts from malfunction due to corrosion, freezing up, road salt, dirt or the like.

A still further object of the invention is to provide an operating means for a emergency valve of a tank or enclosure, which in the event of failure of the source of pressurized air for the motor unit, the valve operating means can be manually operated.

A still further object of the invention is to provide an arrangement of the above type which does not require a substantial amount of expensive machining but which is relatively economical to produce and install at the outlet port of the tank enclosure.

A still further object of the invention is to provide an arrangement of the above mentioned type wherein the seals for the air operated motor unit are maintained lubricated for providing a longer life for the unit.

Other objects and advantages of the invention will be apparent from the following description taken in conjunction with the accompanying drawings wherein.

DESCRIPTION OF PREFERRED EMBODIMENT AND ALTERNATE EMBODIMENT

Figure 1:
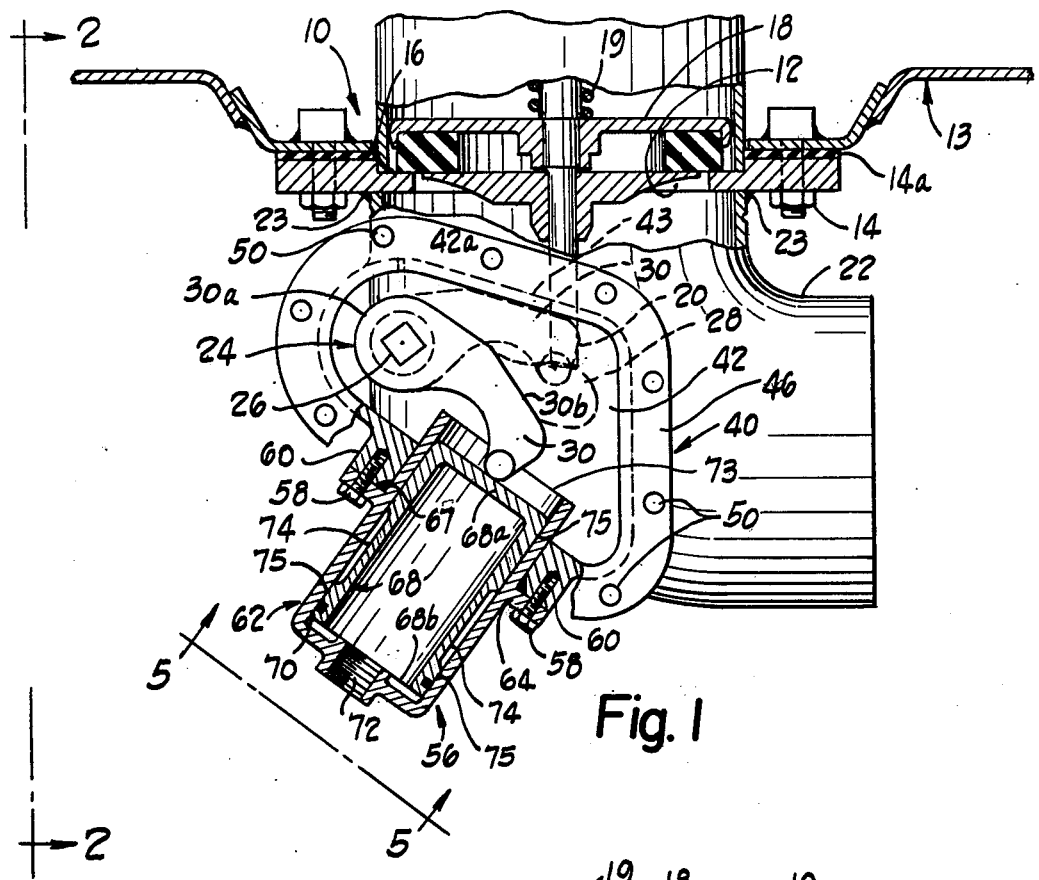
FIG. 1 is a partially sectioned, side elevational view of the emergency valve as mounted at the outlet port of a liquid storage tank, with the valve operating means of the invention associated wherewith. The cover has been removed from the crank case containing the valve operating means to illustrate the accessibility thereof.

Referring now again to the drawings, there is shown an emergency valve 10, many types of which are known in the prior art, associated with an outlet port 12 formed in the bottom wall of a liquid storage tank 13, such as for instance a tank truck or trailer used for transportation of various kinds of liquids, such as for instance gasoline, chemicals, oils of the like. The valve 10 can be secured to the tank at the outlet port by any suitable means, such as, for instance, by the fasteners 14 and sealing means 14a can be provided coacting between the valve and the tank to prevent leakage of the tank's contents about the valve.

The valve 10 may include a valve seat 16 and a movable valve head 18 which is spring loaded as by means of a coil spring 19, so as to be urged toward the closed position of the valve head illustrated in FIG. 1, thereby normally maintaining the emergency valve in closed position and preventing egress of liquid from the tank past the valve head 18. The valve head may conventionally include a depending stem portion 20 which passes through spring 19 and which extends downwardly into the conduit member 22 which is secured as by welds 23 to the underside of the valve member. Upward movement of the stem portion 20 and attached valve head 18 against the resistance to compression of spring 19 will cause opening of the valve 10, thereby permitting liquid to drain past head 18 into the conduit member 22, which in the embodiment illustrated is an elbow which may be of generally conventional type.

A crank 24 is provided for actuation of the emergency valve, with the crank including a generally horizontally arranged shaft 26 to which is affixed an operating head 28 which normally generally engages the underside depending stem 20 in the closed position of the emergency valve 10. The other end of shaft 26 may be provided with an operating lever 30 secured thereto, and which is adapted for actuating the emergency valve in a manner to be hereinafter described. Lever 30 preferably includes flat 30b on its upper surface for a reason to be hereinafter set forth. Crank 24 includes a stuffing box 32 in which the crank shaft 26 is rotatably mounted and which may be mounted on the side wall of conduit member 22 and secured thereto as by means of welds, for supporting the crank in position on the conduit or elbow member 22. Shaft 26 on the end thereof interiorly of conduit 22 can be supported by means of a lug or bracket 36 mounted on or secured to such interior of the conduit 22, and in conventional manner. Stuffing box 32 includes sealing means for normally preventing the escape of liquid from the conduit or elbow member 22 lengthwise along the shaft from interiorly of the elbow to exteriorly thereof. Spring loaded packings are conventionally utilized for such sealing means in conjunction with the stuffing box for preventing such leakage and are known in the art as shown for instance in aforementioned Canadian Pat. No. 684,134.

The actuating or operating lever 30 depends in downwardly and laterally projecting relation from the rotatable shaft 26 of the crank 24, and is disposed within a crank case member 40 which is secured to the exterior side surface of conduit member 22, such as for instance, by means of welds 40a, thus making a tight or generally sealed connection with the elbow 22. Crank case member 40 (as well as conduit 22) may be formed of aluminum, so as to provide a corrosion resistant, relatively light weight assembly.

Figure 2:
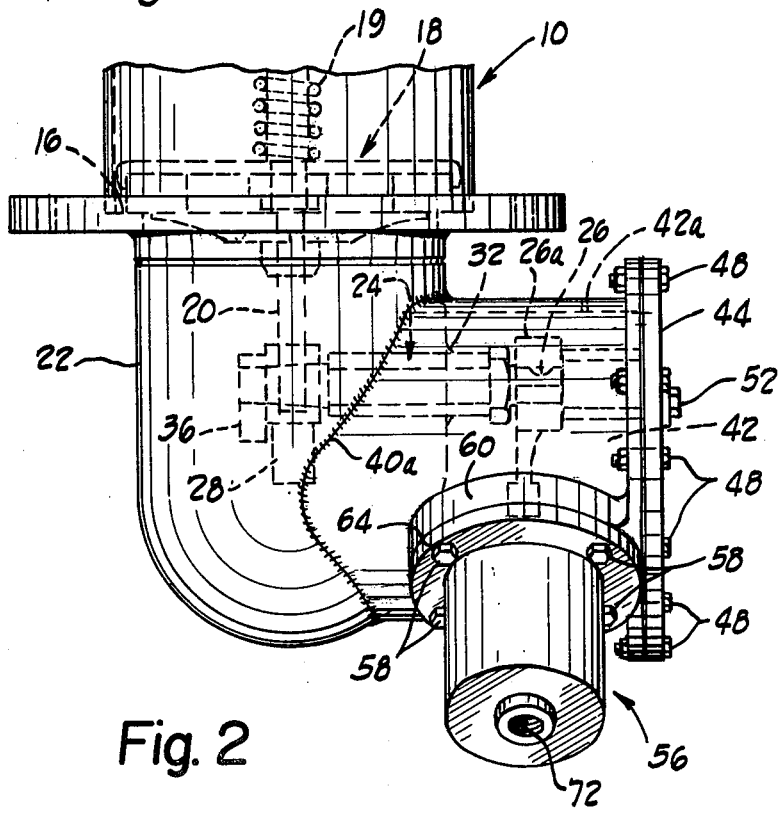
FIG. 2 is an elevational view taken generally along the plane of line 2—2 of FIG. 1, looking the direction of the arrows.

Crank case 40 when attached to conduit 22 defines a closed chamber 42 which is preferably vented as at 42a through an upper wall 43 thereof, (FIGS. 1 & 2). Wall 43 preferably slopes downwardly in a forward direction as illustrated in FIG. 1. A cover member 44 is provided which may be attached to flange 46 of crank case 40 by means of threaded fasteners 48. Cover 44 is removable for obtaining direct access to the interior of the crank case 40. Openings 50 may be provided through flange 46 of crank case 40, for passage of fasteners 48 therethrough. Cover 44 may be provided with an inlet plug 52, which may be selectively removed for providing for the insertion of a preferably liquid lubricant into the crank case to a predetermined level therein. The interior surface of cover 44 may be provided with a projection or lug 54 thereon (FIG. 2) which is adapted to be disposed in close fitting relation to hub 30a of operating lever 30, for aiding in maintaining the stability and position of the operating lever and shaft 26, and in crank case chamber 42.

Figure 3:
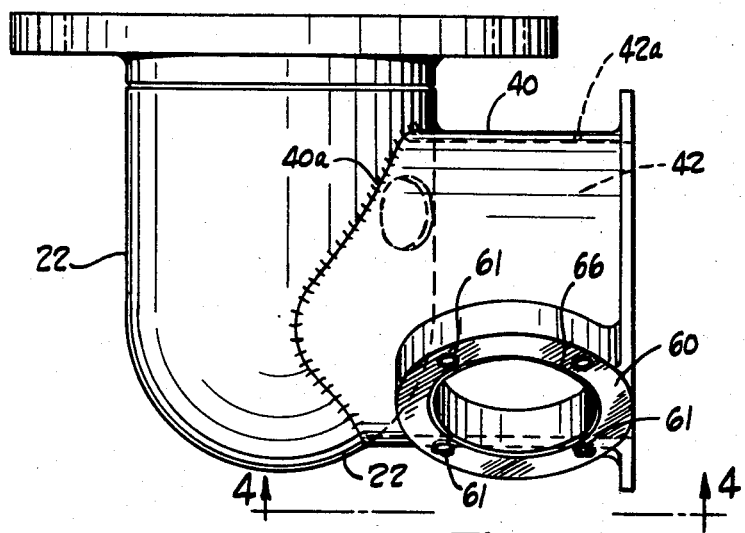
FIG. 3 is a rear elevational view of the crank case housing as secured to the usual conduit member (or elbow) which may conventionally depend from the storage tank of a gasoline or other type liquid transport vehicle.
Figure 5:
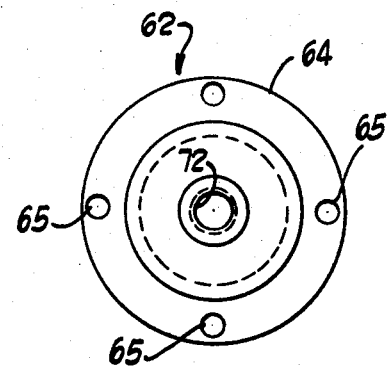
FIG. 5 is an end elevational view of the cylinder of the reciprocal air powered motor unit for the valve operating mechanism, and is taken generally along the plane of line 5—5 of FIG. 1 looking in the direction of the arrows.
Figure 4:
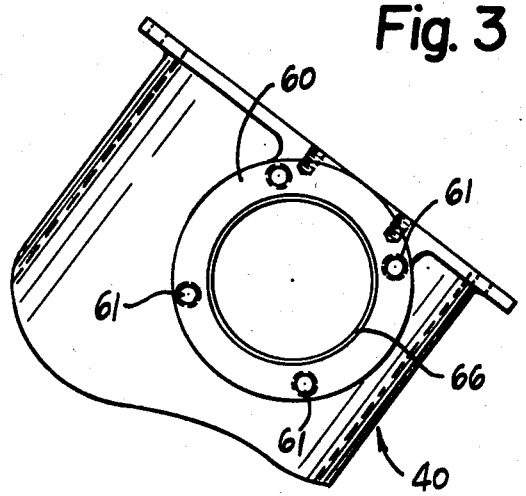
FIG. 4 is a view taken generally along the plane of line 4—4 of FIG. 3 looking in the direction of the arrows, and illustrating the crank case member per se prior to its being attached to the conduit member shown in FIG. 3.
Figure 6:
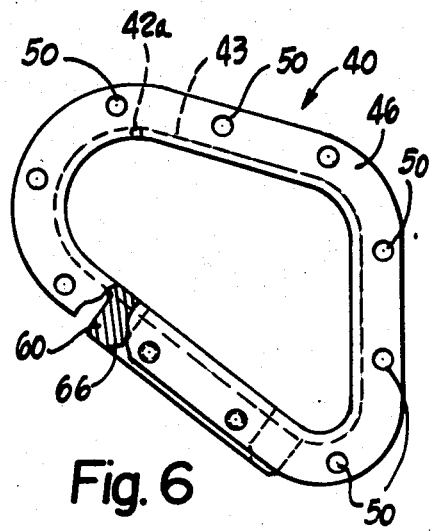
FIG. 6 is a partially broken, side elevational view of the crank case illustrated in FIGS. 3 and 4.
Figure 7:
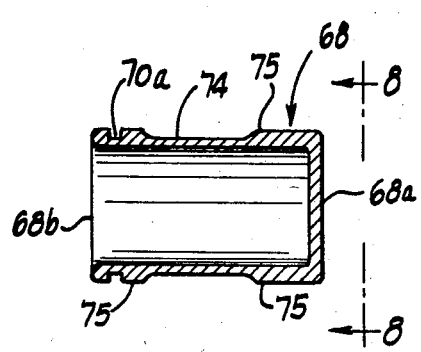
FIG. 7 is an enlarged sectioned view of the piston of the reciprocal air motor unit shown in FIGS. 1 and 2.
Figure 8:
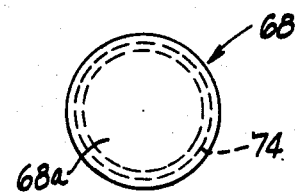
FIG. 8 is an end elevational view of the piston of FIG. 7 taken generally along the plane of line 8—8 of FIG. 7, looking in the direction of the arrows.

In accordance with the invention, a reciprocal air powered motor unit 56, (FIGS. 1 & 2) is connected to the crank case 40 and as by means of removable bolt fasteners 58. The crank case 40 on its exterior underside may be provided with a hub portion 60 (FIGS. 3 & 4) to which is clamped motor unit 56. The openings 61 in the hub may be threaded for receiving the complementary threaded fasteners 58 which attach the motor unit 56 to the crank case.

Motor unit 56 comprises a cylinder 62 which may be formed of anti-corrosion material, such as aluminum, with the cylinder having a laterally projecting flange 64 thereon intermediate the ends of the cylinder, which flange has openings 65 therethrough, through which pass the aforementioned fasteners 58 to detachably clamp the reciprocal motor unit to the hub 60 of the crank case. Hub 60 may be provided with a beveled entry surface 66 (FIGS. 1 & 3) which is adapted to receive a resilient seal member 67 between the flange 64 and the hub 60, for sealing the mounting of the motor unit 56 onto the crank case, and against the engress of lubricant from the crank case. As can be seen from FIGS. 1 and 2, the motor unit 56 extends diagonally downwardly and outwardly away from the crank case 40, and to a level below the level of a horizontal plane passing through the bottom surface of elbow 22.

Piston member 68 is disposed interiorly of cylinder 62, for reciprocal movement therein, with the piston member being closed at one end 68a and opened at its other end 68b. A seal member 70 (FIG. 1) may be disposed in a groove 70a on the exterior of the piston member 68, for sealing the movement of the piston member against the escape of pressurized air in a direction interiorly of the crank case.

An access opening 72 maybe provided in the exterior end of the cylinder 62 of the motor unit adapted for connection to a source of pressurized air, for causing inward actuation of the piston within the cylinder. The closed end 68a of the cylinder is adapted to engage the operating level 30 as shown in FIG. 1, and upon inward movement of the piston, to cause rotation of such lever and thus causing rotation of the shaft 26 and upward acuuation of the cam or operating head 28, thus lifting the valve head 18 of the emergency valve member 10 from the valve seat 16, and thereby permitting liquid in the tank 10 to flow by gravity down past head 18 into the elbow 22.

As can be seen from FIG. 1, the inner end of the cylinder 62 extends interiorly of the crank case through the hub opening therethrough, and the piston 68 is adapted for movement interiorly of the crank case past the open end 73 of the cylinder during actuation of the motor unit 56, to cause actuation rotation of crank 24. The flat 30b on lever 30 enables greater upward movement of the latter before interference with top complementary wall 43 of the crank case.

Piston 68 is preferably just slightly less in length as compared to the interior length of cylinder 62, as can be seen in FIG. 2. The exterior of the piston 68 preferably embodies a circumferential groove 74 therein intermediate spaced land portions 74 on the piston, which groove is adapted to receive a relatively heavy lubricant, such as grease, to help lubricate the movement of the piston 68 with respect to the cylinder 62. Both the cylinder 62 and the piston 68 may be formed of lightweight material, such as aluminum which will give long service life to the unit. Upon release of the air pressure to the motor unit 56, and the release or exaustion of air pressure therein utilizing a conventional control valve (not shown) the spring 19 on the emergency valve will automatically urge the valve head 18 back toward closed position wherein it will engage the valve seat 16 and prevent further egress of liquid from the tank.

It will be seen that with such a sealed arrangement, the parts of operating the emergency valve are sealed against dirt, road salt, corrosion freezing up and the like, resulting in a long service life for the unit. The combined crank case and conduit 22 assembly are fabricated and aid in enabling the unit to be economically manufactured. The seal 70 and piston and cylinder coacting surface of the air unit are lubricated for longer life and thus the seal 70 won't dry out and leak. In the event of the failure of the source of supply of pressurized air, the air hose to opening 72 of the motor unit could be disconnected and an elongated rod inserted therethrough to mechanically or manually activate the crank 24 against the resistance of spring 19, to open the emergency valve; in the alternative, the cover 44 could be removed from crank case 40 to permit access to the crank 24 to manually actuate the emergency valve. However, entry through the motor unit is preferred since no loss of lubricant would be involved.

Figure 9:
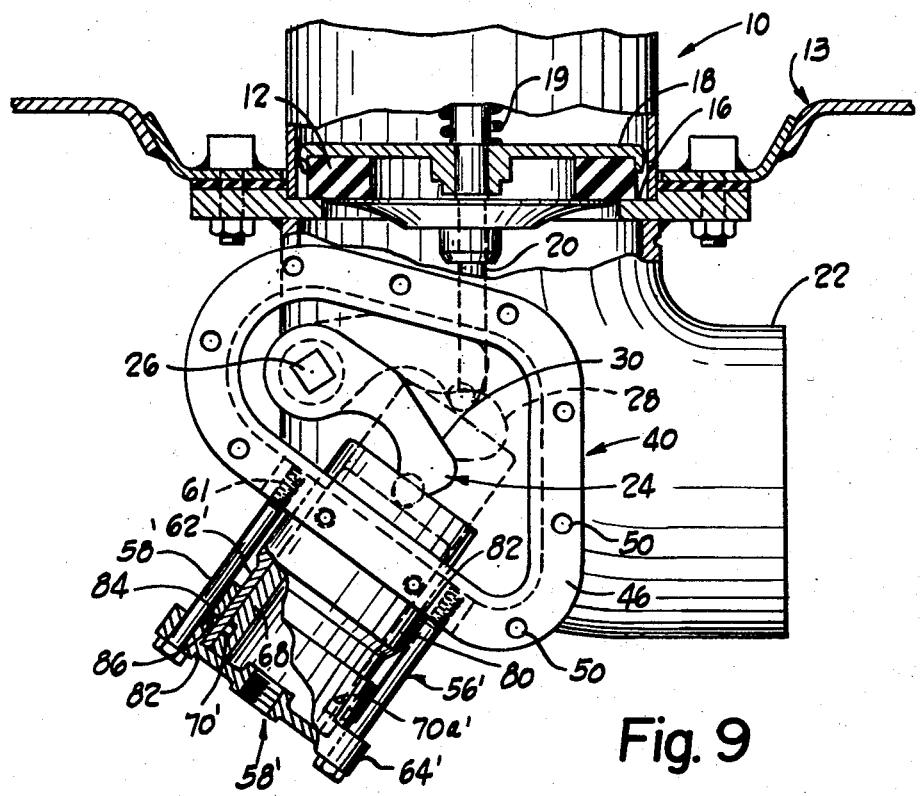
FIG. 9 is a partially sectioned elevational view generally similar to FIG. 1, but showing a modified embodiment of the valve operating mechanism for the emergency valve, and particularly a modified arrangement of air powered motor unit.
Figure 10:
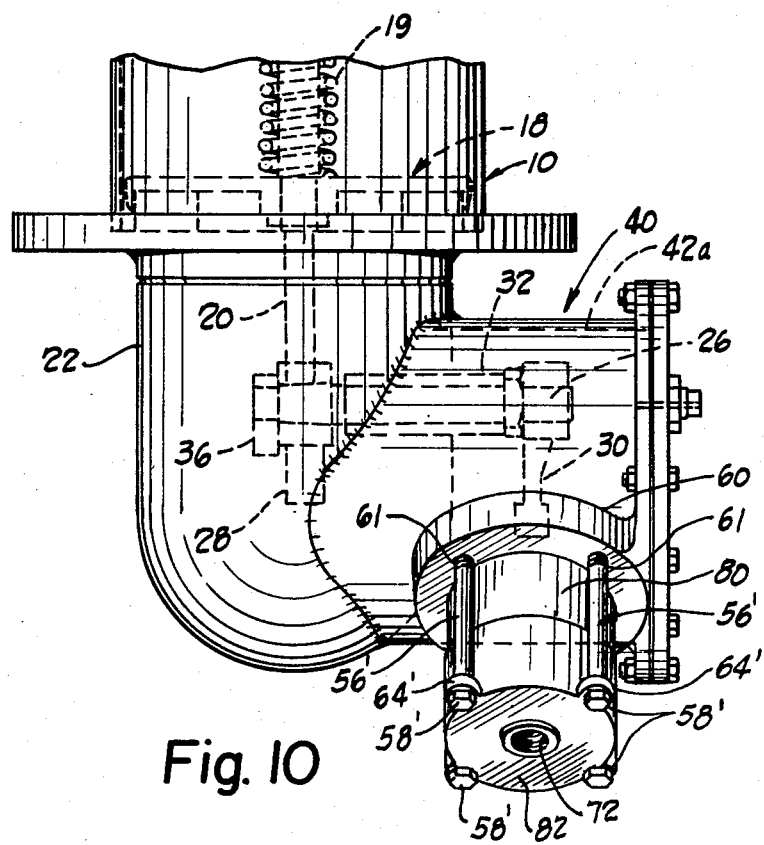
FIG. 10 is a view generally similar to FIG. 2, but showing the modified arrangement of FIG. 9.

Referring now to FIGS. 9 and 10, there is disclosed another embodiment of air operated emergency valve. In this embodiment the reciprocal air unit 56' is mounted on the crank case 40 by threaded fasteners 58'. The cylinder 62' of motor unit 56' is a two-piece affair comprising an inner tubular-like member 80 having an exterior shoulder 82 formed thereon, which is engageable with the embossment 60 on the crank case 40, to position the motor unit with respect to the crank case. An inner end of the cylinder portion 80 extends through the receiving opening in the crank case, and into the interior thereof, similarly to the first described embodiment.

A cover or cap member 82 is provided, with such cap portion 82 including laterally extending ears 64' having openings therethrough, and through which extend the aforementioned threaded bolts or tie rods 58'. These threaded tie rods are threaded into the complementary threaded openings 61 in the embossment 60 on the crank case, to hold the cap member 82 and co-acting tubular portion 80 of the motor unit in tight assembled relation with the crank case.

A circumferential recess 84 maybe provided interiorly of the cap member, which is adapted to receive a sealing member, such as an O-ring 86, for sealing the cap member relative to the inner tubular member 80. Also, the piston 68' of motor unit 56' preferably includes a circumferential recess 70a' receiving therein a sealing member 70' such as an O-ring, for likewise sealing the piston relative to the interior of the cylinder against the escape of pressurized air during lengthwise movement of the piston inwardly of the crank case, the latter causing actuation of the crank 24, and thus opening movement of the emergency valve head 18. Pressurized air is applied into the motor unit 56' in a similar manner as aforedescribed in connection with the first described embodiment. In other respects, the FIGS. 9 and 10 embodiment is generally similar to that of the first described embodiment.

From the foregoing description and accompanying drawings it will be seen that there is provided a valve operating means for a liquid discharge control of storage tank for liquid having an openable valve closure, and comprising a crank which includes an operating head for coaction with a valve stem or depending projection of the valve closure, and including an operating lever connected to the crank head for actuation of the latter, with the lever being enclosed in a crank case, with the crank case being adapted for mounting, so as to project laterally from the conduit member associated with the emergency valve at the exit port thereof; the crank case encloses the lever and provides a reservior for lubricant, against contamination of the valve actuating mechanism by salt, dirt and other contaminents, and an air operated reciprocal motor unit is mounted on the crank case for actuating coaction with the crank, for rapid and convenient opening of the valve closure.

The terms and expressions which have been used, are used as terms of description, and not of limitation and there is no intention in the use of such terms and expressions of excluding any equivalents of any of the features shown or described, or portions thereof, and it is recognized that various modifications are possible within the scope of the invention claimed.

What is claimed is:

1. A discharge control means for a liquid storage tank having an outlet port, said control means comprising an emergency valve including a projecting valve portion, operatively associated with said port and with said valve being normally biased to closed position whereby discharge from said tank is normally prevented, valve operating means assocsited with said emergency valve and responsive to air pressure for overcoming the normal valve closing bias, said valve operating means comprising a crank, which includes an operating head for coaction with said valve portion of the emergency valve and an operating lever, a crank case in which said lever is disposed and which is adapted for receiving therein a lubricant, and an air operated reciprocal motor unit secured to the crank case and including a cylinder and a piston movable lengthwise therein, said piston being adapted for coaction with said lever upon application of pressurized air to said motor unit, to cause said operating head of said crank to move the emergency valve via said valve portion to open position, and wherein said reciprocal motor cylinder has exterior means thereon projecting laterally for detachably connecting said cylinder to said crank case, one end of said cylinder being closed and the other end of said cylinder being open and located within said crank case, and said piston being disposed within said cylinder and adapted for reciprocal movement therein, said piston being adapted for engagement with said operating lever for actuation of said crank upon application of compressed air to said cylinder for actuation of said piston.

2. A control means in accordance with claim 1 wherein said piston on the exterior thereof includes a circumferential recess receiving sealing means for sealing the piston relative to the interior of said cylinder during lengthwise movement of said piston within said cylinder in the direction of said lever.

3. A control means in accordance with claim 1 wherein said piston is open at one end thereof to define a hollow chamber therein with the other end of said piston on the exterior thereof being engageable with said operating lever.

4. A control means in accordance with claim 1 wherein said piston includes a circumferential recess on the exterior thereof receiving therein a lubricating grease adapted for lubricating the lengthwise movement of said piston relative to said cylinder.

5. A control means in accordance with claim 1 wherein said one end of said cylinder which projects exteriorly of said crank case includes an opening therethrough adapted for coupling to a source of pressurized air for causing lengthwise actuation of said piston.

6. A control means in accordance with claim 1 wherein said cylinder at said one end thereof includes means for coupling to a source of pressurize fluid, said one end being disposed exteriorly of said crank case, the other end of said cylinder extending into the interior of said crank case, and said laterally projecting exterior means comprising a circumferential flange disposed intermediate said ends of said cylinder, said flange having bolt openings therethrough.

7. A control means in accordance with claim 1 wherein said crank case includes an opening in the upper portion thereof for venting the interior of said crank case.

8. A control means in accordance with claim 1 wherein said crank case includes a lateral side access opening, and a cover detachably connected to said opening, said cover including means providing for insertion of lubricant into the interior of said crank case from the exterior thereof.

9. A discharge control means for a liquid storage tank having an outlet port, said control means comprising an emergency valve including a projecting valve portion, operatively associated with said port and with said valve being normally biased to closed position whereby discharge from said tank is normally prevented, valve operating means associated with said emergency valve and responsive to air pressure for overcoming the normal valve closing bias, said valve operating means comprising a crank, which includes an operating head for coaction with said valve portion of the emergency valve and an operating lever, a crank case in which said lever is disposed and which is adapted for receiving therein a lubricant, and an air operated reciprocal motor unit secured to the crank case and including a cylinder and a piston movable lengthwise therein, said piston being adapted for coaction with said lever upon application of pressurized air to said motor unit, to cause said operating head of said crank to move the emergency valve via said valve portion to open position, and wherein said cylinder has means extending laterally thereof adapted for engagement with the exterior of said crank case and which includes means for securing said motor unit to said crank case, one end of said cylinder being received through a complementary opening in said crank case and extending into the interior thereof, the other end of said cylinder including means providing for insertion of pressurized air into the interior of said cylinder and into actuating coaction with said piston, and means sealing said cylinder with respect to said crank case at said crank case opening for preventing egress of lubricant from said crank case opening, said one end of said cylinder being open for movement of said piston therethrough during lengthwise movement thereof for actuation of said crank to open said emergency valve.

10. A control means in accordance with claim 1 including an elbow secured to the tank at said outlet port, said elbow having an opening through a side wall thereof, through which extends said crank, said crank being located in said elbow with said valve portion of said emergency valve projecting downwardly interiorly of said elbow and engaged by said operating head of said crank, and said crank case being welded to the exterior of said elbow so as to project laterally thereof, said reciprocal motor unit extending downwardly from said crank case and projecting through a horizontal plane passing through the underside of said elbow.

11. A valve operating means for a liquid discharge control of a liquid storage tank having an emergency valve including a projecting valve stem operatively associated with a discharge port in the tank and with such emergency valve being normally biased to closed position whereby discharge from the tank is normally prevented, said valve operating means comprising a crank which includes an operating head for coaction with the valve stem of the emergency valve and an operating lever connected to said head for actuation of the latter, a crank case in which said lever is moveably mounted, and an air operated reciprocal motor unit secured to said crank case on the exterior thereof, said motor unit including a cylinder and a piston moveable lengthwise interiorly of said cylinder, said piston being adapted for engaging coaction with said lever upon application of pressurized air to said motor unit to cause said operating head of said crank to move the associated emergency valve via its valve stem to open position, and means on said cylinder for insertion of pressurized air interiorly of said cylinder and into actuating coaction with said piston, and wherein said piston is closed at one end thereof adapted for coaction with said lever of the crank, the corresponding end of said cylinder opening interiorly of said crank case for movement of said piston therethrough into said crank case.

12. A valve operating means in accordance with claim 11 wherein said cylinder is formed in two parts comprising an open ended cylindrical-like tube member having means projecting laterally thereof for abutting coaction with the exterior of said crank case to limit the movement of one end of said tube member interiorly of said crank case, and the other end of said tube member extending exteriorly of said crank case and being open, a separate cover member capping the open exterior end of said tube member, and having sealing means coacting therewith for sealing said cover member with respect to said cylinder, said cover member including an opening therein adapted for coupling to a source of pressurized air for said application of pressurized air interiorly of said cylinder and into actuating coaction with said piston, means on said piston for sealing the piston with respect to the interior of said tube member during actuation movement of said piston in said cylinder, said cover member including openings which receive means adapted for clamping the cover member into capping engagement with said tube member and for holding said reciprocal motor unit to said crank case, the last mentioned means comprising headed elongated tie bolts coacting with lateral arms on said cover member and through the last mentioned openings therein, and having threaded engagement with complementary threaded openings on said crank case for securing the motor unit to said crank case.

13. A valve operating means in accordance with claim 11 including means on said piston for lubricating the interior of said cylinder, and sealing means on said piston for sealing lengthwise movement of said piston relative to the interior of said cylinder.

14. A valve operating means in accordance with claim 11 wherein one end of said cylinder projects diagonally downwardly from the exterior of said crank case, and means for detachably connecting said motor unit to said crank case comprising means extending laterally of said cylinder and threaded bolt means coacting with the last mentioned laterally extending means.

* * * * *